Figure 1:
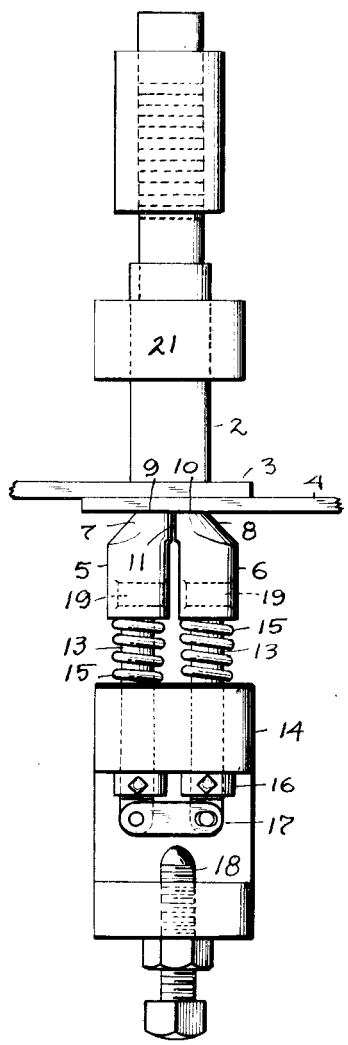

Aug. 11, 1925.

A. C. TAYLOR

METHOD OF ELECTRICAL WELDING

Filed Feb. 3, 1923

1,548,858

2 Sheets-Sheet 1

Inventor:
A. C. Taylor

Attorneys

Aug. 11, 1925.
A. C. TAYLOR
1,548,858
METHOD OF ELECTRICAL WELDING
Filed Feb. 3, 1923  2 Sheets-Sheet 2
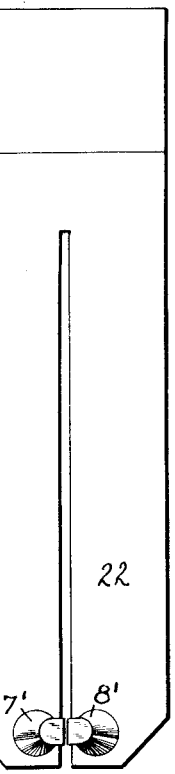
FIG. 3.
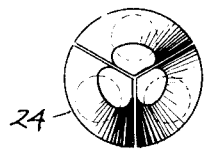
FIG. 5.
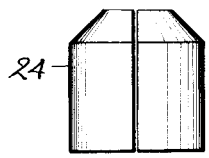
FIG. 6.
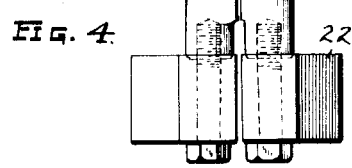
FIG. 4.
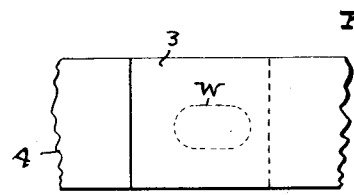
FIG. 7.
FIG. 8.
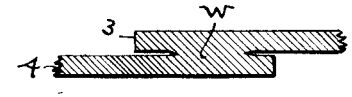
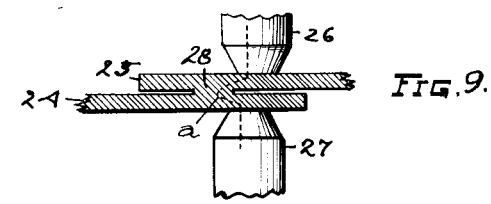
FIG. 9.
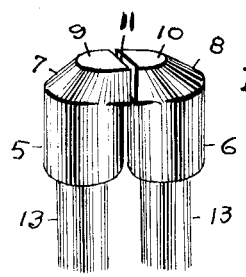
FIG. 10
Inventor
A. C. Taylor
By Fisher, Moser & Moore
Attorney Patented Aug. 11, 1925.

1,548,858

UNITED STATES PATENT OFFICE.

ALBERTIS C. TAYLOR, OF WARREN, OHIO.

METHOD OF ELECTRICAL WELDING.

Application filed February 3, 1923. Serial No. 616,712.

*To all whom it may concern:*

Be it known that I, ALBERTIS C. TAYLOR, a citizen of the United States, residing at Warren, in the county of Trumbull and State of Ohio, have invented certain new and useful Improvements in a Method of Electrical Welding, of which the following is a specification.

This invention is an improvement in electric welding methods and means, and more particularly an improvement over the methods and means heretofore practiced for welding the meeting faces of metal sheets and other parts together in spots or circumscribed areas by pressure and an electric welding current. Thus the general practice is to pass an electric welding current through the sheets in a direct path which is more or less fixed by two oppositely-situated electrodes, and in so doing it is well known that the size of the weld obtained is limited and that mere enlargement of the electrodes will not produce correspondingly larger welds as other factors hinder or prevent such results. On the other hand it is also generally conceded that it is exceedingly desirable and of great value to enlarge and strengthen such welds, wherefore the main object of this invention is to provide a method and means for producing spot welds of larger area and greater strength than has hitherto been possible by the methods and means commonly employed. For example, I am familiar with the known methods of electric welding involving the use of a single set of electrodes, whereby pressure is applied and an electric current is passed through the work on a line at right angles to the plane of the surface being welded, the pressure being applied by direct contact of the electrodes at the place or spot where the greatest heat is produced. Such practices have valued uses but also their limitations as in many instances the size and strength of the weld produced is not sufficient nor satisfactory for all classes of work. Thus in welding with electrodes in the usual way the size of a spot weld is limited by the thickness of the material being welded, and by other conditions more or less inherent in the work and electrodes which determine the exact path of the welding current and a definite beginning place or core for the weld. Other conditions affect the making and maintaining of a perfect electrical contact within the entire circumscribed area involved especially under the reactions and changes which occur. To elucidate, if two single welding electrodes having smoothly finished contact ends, one inch in diameter adapted to make perfect electrical contact throughout their entire contacting surfaces, are placed oppositely in contact with two perfectly parallel sheets of metal one-eighth of an inch in thickness, and a heavy pressure is applied while passing a welding current through the parts, a weld of approximately three-sixteenths to one-fourth of an inch in diameter will be produced notwithstanding the electrode contact ends are one inch in diameter, and furthermore there is no way of controlling the location of the weld within the one-inch contact area. In other words the weld actually produced is much smaller than the contact electrode and each subsequent weld is invariably located in a different place within the circumscribed field of contact. The reason for this is not fully understood but apparently the current passes through the sheets at some particular favorable point and instantly heats the metal and expands it at that point; this expansion of the metal then causes the surfaces of the plates to bulge at this particular point, and possibly the contact surfaces of the electrodes are also expanded and bulged at the same immediate point so that the current continues to flow through this path because the remaining contact surfaces are either separated from or not as solidly seated upon the work or because some inherent property or characteristic in the metals being used or operated upon determines the exact path and effective spread of the welding current. In any event mere enlargement of the contacting end of the electrodes does not determine the size of the weld, as only a small weld, smaller than the electrode, is made. However, I have discovered a way to produce a larger and stronger weld and to definitely fix the location of the welding current in the welding area of contact and in the work using a single electrode on one side of the work and two or more electrodes on the opposite side of the work. These electrodes are entirely independent of each other and are brought in contact with the work, preferably in close juxtaposition and under yieldable pressure.

Figure 2:
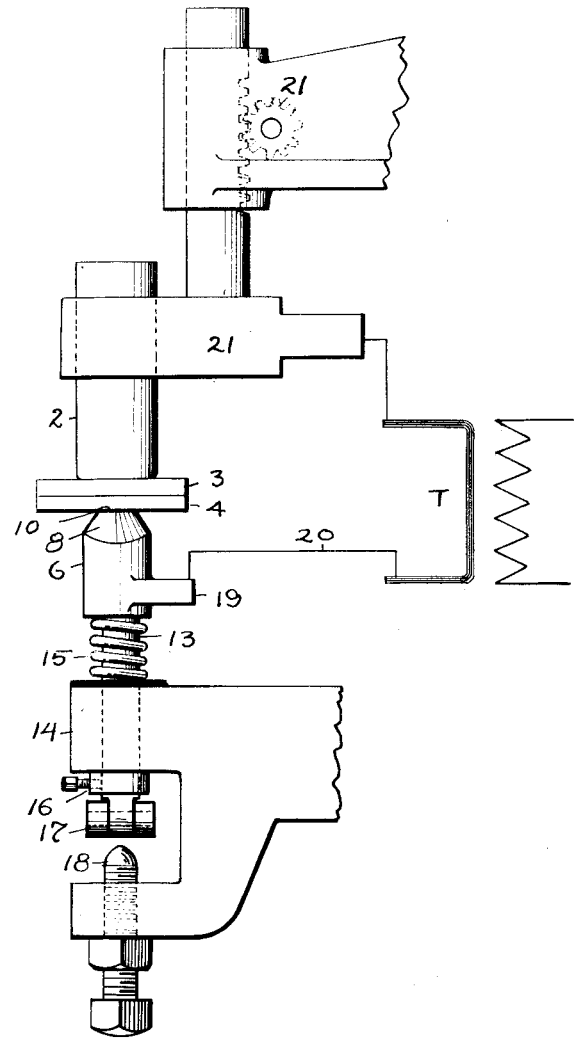

In the accompanying drawings, Figs. 1 and 2 are front and side views of a welding apparatus which may be used to produce welds according to my invention. Fig. 3 is a top view of a split or divided spring horn which may be used in a welding machine to support a bi-parted electrode in making welds according to my invention. Fig. 4 is a front or end view of the divided horn and bi-parted electrode shown in Fig. 3. Figs. 5 and 6 are end and side views respectively, of a tri-parted electrode. Figs. 7 and 8 are plan and sectional views illustrating the approximate form of a weld produced with a bi-parted electrode. Fig. 9 is a side view of a pair of single power electrodes such as commonly used, the dotted line showing the line of least resistance for a welding current when welding is attempted contiguous to a completed spot weld in two sheets or strips of metal. Fig. 10 is a perspective view of a bi-parted or pair of complementary electrodes.

The welding apparatus shown in Figs. 1 and 2, comprises a single vertically-movable copper electrode 2 of relatively large diameter having a smoothly-finished flat end adapted to bear down upon the work to be welded. To exemplify, the article to be welded may consist of a sheet metal plate or strip 3 laid upon a second plate or strip 4. The bottom plate 4 is placed at rest upon a sectional or parted electrode or a multiple number of electrodes, for example a pair of complementary copper electrodes 5 and 6 having reduced tapering contact points 7 and 8, terminating in flat semi-circular or semi-oval contact faces 9 and 10, respectively. Each contact point 7 and 8 is offset in respect to the vertical axis of the main body or stem of which it forms an integral part, and the two offset points are set closely adjacent each other with a narrow space or air gap separating them vertically on a line coincident with the axis of the larger upper electrode 2. The opposed vertical faces 11 of the contact points 7 and 8 are made flat to provide parallel juxtaposed straight edges for the flat contact faces 9 and 10, the two points 7 and 8 making in appearance and effect a laminated or bi-parted lower electrode, viewed from the top, in which the two semi-oval contact faces 9 and 10 make a substantially elliptical figure which is slightly parted transversely at its middle. Each semi-oval contact face approximates the maximum size of a spot weld as heretofore produced following common practices upon a piece of work in which the thickness or properties of the metal and other factors limit or determine the maximum size of the weld. Consequently I increase the size of the weld in a single welding operation by using two or more contact points set closely together within the field or area of direct pressure and electrical contact obtained by a single upper electrode, or a bi-parted pressure-applying electrode, and by permitting each contact point to act independently of the others immediately adjacent thereto. Thus referring to Figs. 1 and 2, each point 7 and 8 has a reduced stem 13 mounted to slide vertically within a stationary arm 14 but upheld by a coiled spring 15 resting upon the upper face of said arm. An adjustable collar 16 on each stem limits the upward movement of these points relatively to each other, and a link 17 connects their corresponding lower ends opposite an adjustable screw 18 which serves as a stop limit for the downward movement of the points. The pointed end of the screw affords a rest for the link centrally between the points so that when the movement of the points downwardly is arrested an equalizing pressure will be obtained. Thus in a welding operation initial heating occurs under the compensating-pressure of the two springs and then welding and upsetting of the metal follows under a heavier and more positive pressure equalized by link 17 when stopped by screw 18. Each point 7 and 8 has a lateral lug 19 to which the flexible secondary bands of a transformer may be connected, substantially as shown diagrammatically in Fig. 2 wherein T represents the transformer and 20 the connecting conductors or bands. The upper electrode 2 is secured in a holder 21 which is also electrically connected to the secondary of the transformer T as usual. Any suitable pressure applying device may be used to raise and lower electrode 2, a rack and gear 21 being shown in the present instance as an exemplification of one operating assembly.

In Figs. 3 and 4, I show a pair of copper welding points 7' and 8' bolted upon a bifurcated copper bar or welding horn 22 which may be connected to the secondary of a transformer. Bar 22 is relatively heavy and long and quite rigid, but being divided longitudinally for the greater part of its length, each divisional part or arm possesses sufficient spring to permit the individual points to yield independently in welding a piece of work placed at rest upon both points. Two separate arms may be used instead of a bifurcated bar to support the spaced welding points, which are opposed by a pressure-applying electrode in the same way as shown in Figs. 1 and 2.

In Figs. 5 and 6, a three point electrode 24 is illustrated which is designed to contact with the work at three juxtaposed places so closely contiguous that welding of all of the material contacted by the three points will occur approximately simultaneously upon applying pressure and passing an electric welding current through a single larger pressure-applying electrode situated opposite thereto.

In practicing my present method of welding the metal parts to be united together are placed in overlapping or superposed position upon the lower set of welding points and the upper electrode is then lowered into contact with the upper side of the top piece of metal. An electric welding current of high amperage and low voltage is then switched on and the sheets or pieces of metal between the electrodes is rapidly heated to a welding temperature by the electric current passing through the meeting faces of the overlapping faces within the circumscribed area of contact of the single electrode above and the set of points or parted electrodes below. The electric current in passing through the work finds its most direct course to and through one or the other of the two or more welding points engaging the bottom side of the work. However the current may be divided and distributed to all of the contiguous welding points at the same time, if not equally then unequally. Then as pressure is applied by means of the single upper electrode the parted electrodes or separated points all yield together to the pressure from above. Inequalities in thickness of the material being welded, scale, etc., may cause unequal starting movements of the segregated welding points and also slight variations in contact and pressure at the segregated contact areas, but the supporting springs for the individual points, or the inherent spring in the arms supporting the points, compensate for such inequalities. Then as the springs are being compressed the path of the current becomes fixed at several places of contact instead of only one and a uniform welding temperature is obtained over a relatively larger area than that considered heretofore feasible. To obtain this result, I set the individual welding points close together and provide a slight vertical play between them, whereby such points adapt themselves instantly to any changing conditions arising within the common area of contact. When uniform heating and a welding temperature is established throughout the entire area of contact, all of which must occur rapidly without burning or injuring the metal, the pressure on the upper electrode is increased to upset the weld. This occurs in the apparatus shown in Figs. 1 and 2, when the connecting link between the bottom set of electrodes engages the stop screw and a heavy pressure is imparted to the work by the upper electrode. In the modification shown in Figs. 3 and 4, the spring action in the divided arm or horn is limited, a strong resistance to down pressure being built up when a final set is required. But this form of apparatus permits an accommodating play between the divided current-diverting electrodes or points during the initial steps of welding, and also permits a heavier final pressure to be quickly applied to force the metal together and complete the weld after the electrodes have found their own bearing. The welding current may be derived from a single transformer connected to the electrode holders, or I may connect a separate transformer to each current-diverting welding point. In the latter case the transformers are connected jointly to the upper or pressure-applying electrode and separately to the other welding points, and instead of pointed electrodes I may use other forms of current and pressure applying devices providing they are closely juxtaposed and related substantially as herein disclosed.

The product of the present method is illustrated in Figs. 7 and 8, the oval figure W shown in dotted lines in Fig. 7 representing the completed weld, and the same weld being shown in section in Fig. 8 to more clearly indicate the amount of material involved compared with the combined thickness of the plates. In Fig. 9, I show two overlapping plates 24 and 25 and two pointed electrodes 26 and 27, the plates having a weld 28 already produced therein. In attempting to enlarge this weld, say to the size of the elongated weld shown in Fig. 7, it would be necessary to produce a second weld contiguous to the one already made. This is not practical for the reason that when the electrodes are placed as shown in Fig. 9, the greatest part of the current will travel through the previously welding portion as indicated by the dotted line —a—, which is the path of least resistance and not enough current will pass directly through from one electrode to the other to make a dependable weld of the strength and size desired. Furthermore if a good weld is made adjoining another it would require two operations instead of one as compared with my method. In making a weld with my method, using two or more vertically-parted electrodes the conditions are balanced or made uniform and the current passes directly through the work at a diversity of points from the upper electrode to the lower set of electrodes, thereby resulting in one large weld of great strength in one operation. To permit each individual electrode or welding point to operate under independent pressure I may either use springs, air pressure, rubber cushions, etc., or take advantage of the natural spring in the horns or conductors supporting the electrodes. From the foregoing it will readily be seen that no matter what size weld may be produced with a single pair of electrodes of opposite polarity as heretofore used, with my method I am enabled to produce a weld twice as large using two electrodes of the same polarity closely juxtaposed on the same side of the work, and a weld approximately three times as large by juxtaposing three electrodes of the same polarity, and so on within practical limit using a multiple number of closely juxtaposed electrodes, each having relatively small contact ends or points.

What I claim is:

1. A method of electric resistance welding, consisting in pressing contacting pieces of metal together under a differentiating pressure within a relatively small circumscribed area of contact while passing an electric welding current through the material within the same circumscribed area until a uniform welding temperature is reached throughout the involved area of pressure and contact.

2. A method of electric resistance welding, consisting in bringing separate pieces of metal into facial contact and applying pressure in a compensating manner at closely juxtaposed places within a small circumscribed area thereof while passing an electric welding current transversely through the meeting surfaces of said pieces at said juxtaposed places until a single large spot weld is produced.

3. A method of electric resistance welding, consisting in placing overlaid pieces of metal between a multiple number of pressure applying and electric current conducting electrodes and in imparting a diversified pressure within a small circumscribed area to one side of the overlaid pieces while applying pressure on the opposite side over the same area and passing an electric welding current through the overlaid pieces within the involved area.

4. A method of electric resistance welding which comprises the step of placing separate pieces of metal into facial contact with a number of closely-juxtaposed welding points, and the steps of applying pressure to said pieces opposite said points while passing an electric welding current through the pieces and points under a compensating play of said points during pressure-applying operations until a single spot weld is produced within the contact area of all said points.

5. A method of electric resistance welding, comprising the step of placing overlapping pieces of metal between a multiple number of pressure-applying electric-current conducting electrodes, including independently-movable juxtaposed welding points, while applying pressure and passing an electric welding current to and through said pieces under a compensating play of said independently-movable points until a desired heating and welding temperature is effected, and finally upsetting the heated material by positive pressure applied to all the electrodes and the material within the pressure-applying area.

6. A method of electric resistance welding comprising the steps of engaging one side of the work to be welded by a multiple number of closely-juxtaposed independently movable welding points and of applying a compensating pressure to the work at said points while passing an electric welding current through the points, and finally equalizing the pressure to upset the weld.

7. A method of producing a welding temperature in an extended spot in the meeting surfaces of two or more contacting pieces or sheets of metal, consisting in placing said pieces between a single and a sectional laminated electrode; in applying pressure with said electrodes while permitting the sections of the laminated electrode to move independently under the applied pressure; and in passing a divided electric current through the sheets and electrodes on the line of applied pressure until a welding temperature has been reached.

8. A method of producing a welding temperature in an extended spot in the meeting surfaces of two or more contacting pieces or sheets of a metal, consisting in placing said pieces between a single and a sectional laminated electrode; in applying pressure with said electrodes while permitting the sections of the laminated electrode to move independently under the applied pressure; and in passing a divided electric current through the sheets and electrodes on the line of applied pressure until a welding temperature has been reached, and then applying additional pressure with said electrodes to complete the weld.

In testimony whereof I affix my signature hereto.

ALBERTIS C. TAYLOR.